UNITED STATES PATENT OFFICE.

FRANK E. CULVER, OF PORT CLINTON, OHIO.

RETARDER FOR CALCIUM-SULFATE PRODUCTS.

1,330,058. Specification of Letters Patent. Patented Feb. 10, 1920.

No Drawing. Application filed March 17, 1919. Serial No. 283,084.

*To all whom it may concern:*

Be it known that I, FRANK E. CULVER, a citizen of the United States, and a resident of Port Clinton, in the county of Ottawa and State of Ohio, have invented a certain new and useful Retarder for Calcium-Sulfate Products; and I do hereby declare the following to be a full, clear, and exact description of the invention, such as will enable others skilled in the art to which it appertains to make and use the same.

This invention relates to a compound for use in calcium sulfate products, such, for instance, as plaster of Paris, calcined gypsum, calcined plaster, calcined stucco, etc., to retard the setting or crystallization thereof when in a plastic state; and has for its object to produce a simple and comparatively inexpensive compound of this character, the ingredients of which are plentiful and easily obtainable.

The retarding agents which have had practically exclusive use in recent years for this purpose have included animal hair, reduced by chemical action to a liquid, as an essential ingredient thereof. Hoofs, horns, hides, sinew, fish, chrome leather scrap, etc., have also been reduced to a liquid and used to some extent in the manufacture of a retarder for calcium sulfate products. The growing scarcity of cattle and the high cost of all animal products has emphasized the importance of producing a practical and efficient retarder which does not utilize animal products in its production.

I have found from experiments that a most excellent retarder for controlling the set of calcium sulfate products can be produced by combining a vegetable gluten with a substance preferably of an absorbent earthy nature, such, for instance, as lime, clay, gypsum or other earthy mineral, as a carrier for the gluten and adding a suitable solvent thereto. In practice I preferable use lime primarily as the carrier, and caustic soda, potash or other sodium substance as the solvent. It will be understood, however, that the invention is not limited to these, as any substance or substances may be used which will act singly or together to form a suitable carrier for the gluten and as a solvent to break it up.

Vegetable gluten may be obtained from wheat, corn, rice, beans and many other cereals and vegetables, and the gluten and gluten liquors obtained as by-products in the manufacture of starch may be used to advantage. It is preferable, however, to use wheat or corn gluten or the liquor or waste water from the former. Wheat liquor is the waste water from the manufacture of wheat starch and has been and is now entirely a waste and run into the sewer.

The gluten is preferably used in the granular or ground state but can be used in the "green" state as it comes from the starch tables, the gluten liquor being pressed therefrom preparatory to drying and grinding the gluten into gluten meal, and for gluten feed, which is a mixture of gluten meal and corn bran. The liquor pressed from the "green" gluten, as well as the gluten feed containing the corn bran, may also be used.

In the preferred method of producing my retarder, the gluten is mixed dry with lime, which may be either hot, slaked or hydrated, in the proportion of approximately one to two parts of gluten to one to five parts of lime, depending upon the strength of the gluten used, and with caustic soda, sal-soda, soda ash, potash or other solvent, the proportion of which is approximately 20 to 33 per cent. of the weight of the gluten used. Sufficient water is then added to reduce the mixture to a thin paste consistency and to prevent the albumin contents from burning if hot lime is used and the mixture then allowed to stand and soak for from two weeks to a month or longer to soften or break up the gluten and for the lime or other carrier to absorb the gluten. If time is an item the compound may be boiled from two to five hours to take the place of soaking. It is sometimes preferable to soak the raw gluten before adding to the mixture. It will be understood that the term "soaking" as used in the claims means the soaking accomplished either by cold time soaking, by boiling, or in any other manner.

After the boiling or soaking process the compound is allowed to solidify in mass and is then cut into cakes or blocks and slow dried, and afterward pulverized into its commercial form.

It is found that muriatic acid, acetic acid, tartaric acid, or other similar acids may also be used as the solvent or breaking up agent for the gluten. For instance, if muriatic acid is mixed with the gluten in the proportion of about 2% to 8% of the gluten used, enough water then added to keep the gluten in a moist condition, and the mixture allowed to soak from 6 to 18 days, the gluten is practically soluble. It can then be mixed with dry slaked lime, dried and pulverized for use, as a retarder. By this treatment boiling of the mass is rendered unnecessary.

In using this retarder compound, from two to ten pounds is mixed with each ton of calcium sulfate, the amount used being determined by the length of time desired for obtaining a set of the product and by the strength of the retarder.

It is found that wheat gluten is much stronger than corn gluten, and that if the former is used it may be mixed with lime in a proportion approximating one part of gluten to one to five parts of lime, depending on the strength desired, while if corn gluten is used, a larger percentage of gluten for the same strength retarder should be used, the mixture being substantially one to two parts gluten to one part lime. If weight is an item, as in saving freight charges when shipping long distances, wheat gluten, on account of its greater strength, should be used, and the mixture might include equal parts of lime and gluten.

I wish it understood that my invention is not limited to any specific manner of compounding, or to the proportions noted or to the use with vegetable gluten of the specific substances noted, as numerous variations and changes may be made without departing from the invention as defined in the claims.

Having thus described my invention, what I claim as new and desire to secure by Letters Patent, is,—

1. A retarder of the class described including a vegetable gluten as the retarding agent, and a carrier and solvent for the gluten.

2. A retarder of the class described including a vegetable gluten as the retarding agent, and a carrier of earthy nature and a solvent of alkaline nature for the gluten.

3. A retarder of the class described including vegetable gluten, lime, and a solvent agent for the gluten.

4. A retarder of the class described including one to two parts of vegetable gluten, one to five parts of lime, and 20 to 33 per cent. of sodium compound to weight of gluten used.

5. A retarder of the class described, including wheat gluten as the retarding agent, and a carrier and solvent for the gluten.

6. A retarder of the class described, including wheat gluten as the retarding agent, and a carrier of earthy nature and a solvent of alkaline nature for the gluten.

7. A retarder of the class described, including wheat gluten, lime and a solvent for the gluten.

8. A retarder of the class described, including 1 to 2 parts of wheat gluten, 1 to 5 parts of lime, and 20 to 33 per cent. of sodium compound of weight of gluten used.

9. The method of making a retarder of the class described, which consists in mixing together a vegetable gluten, lime and a sodium compound, adding water thereto to render the mixture in the form of a thin paste, then effecting a thorough soaking of the mixture after which it is allowed to solidify in mass and is then dried and pulverized.

10. The method of making a retarder of the class described, which consists in mixing together a vegetable gluten, a carrier of an absorbent earthy nature and a solvent of an alkaline nature, adding water to render the mixture in the form of a thin paste, then effecting a thorough soaking of the mixture after which it is allowed to solidify in mass and is then dried and pulverized.

11. The method of making a retarder of the class described, which consists in mixing together wheat gluten, lime and a sodium compound, adding water thereto to render the mixture in the form of a thin paste, then effecting a thorough soaking of the mixture after which it is allowed to solidify in mass and is then dried and pulverized.

12. The method of making a retarder of the class described, which consists in mixing together wheat gluten, a carrier of an absorbent earthy nature and a solvent of an alkaline nature, adding water to render the mixture in the form of a thin paste, then effecting a thorough soaking of the mixture after which it is allowed to solidify in mass and is then dried and pulverized.

13. The method of making a retarder of the class described, which consists in mixing together wheat liquor, lime and a sodium compound, then effecting a thorough soaking of the mixture after which it is allowed to solidify in mass and is then dried and pulverized.

14. The method of making a retarder of the class described, which consists in mixing together wheat liquor, a carrier of an absorbent earthy nature and a solvent of an alkaline nature, then effecting a thorough soaking of the mixture after which it is allowed to solidify in mass and is then dried and pulverized.

15. The method of making a retarder of the class described, which consists in mixing together wheat gluten, lime and a sodium compound, and if necesssary adding water thereto to render the mixture in the form of a thin paste, then effecting a boiling of the mixture after which it is allowed to solidify in mass and is then dried and pulverized.

In testimony whereof I have hereunto signed my name to this specification.

FRANK E. CULVER.